R. H. BOWEN.
HOLDER FOR BEARING MATERIAL IN PULLEYS.
APPLICATION FILED OCT. 1, 1910.
Reissued July 4, 1911. 13,265.
FIG. I.
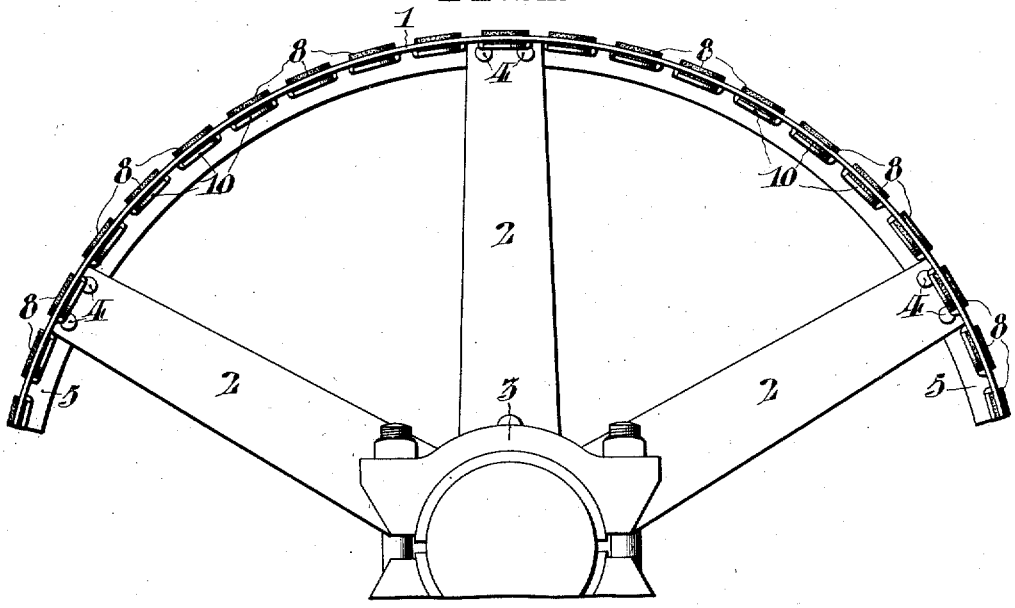
FIG. II.
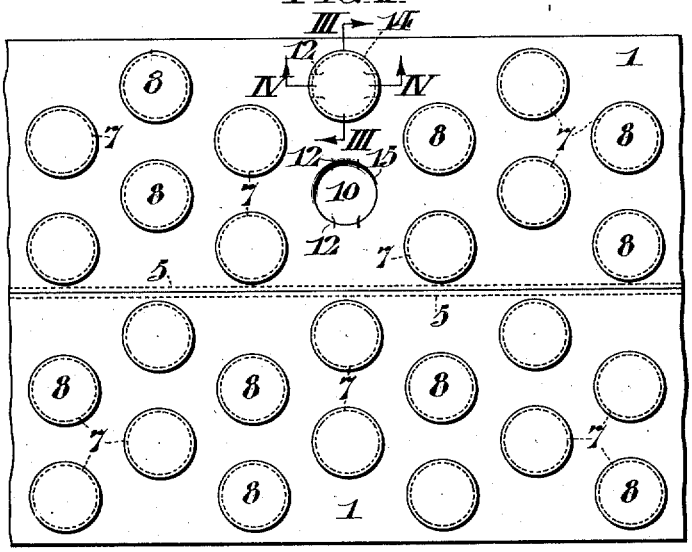
FIG. III.
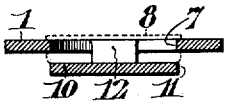
FIG. IV.
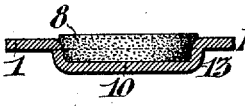
Inventor
Russell H. Bowen,
By Kelley & Paul
Attorneys
Witnesses
John C. Bergner.
James H. Bell.
COLUMBIA PLANOGRAPH CO., WASHINGTON, D. C.

UNITED STATES PATENT OFFICE.

RUSSELL H. BOWEN, OF PALMYRA, NEW JERSEY, ASSIGNOR TO THE AMERICAN PULLEY COMPANY, OF PHILADELPHIA, PENNSYLVANIA, A CORPORATION OF PENNSYLVANIA.

HOLDER FOR BEARING MATERIAL IN PULLEYS.

13,265. Specification of Reissued Letters Patent. Reissued July 4, 1911.

Original No. 959,424, dated May 24, 1910, Serial No. 546,032. Application for reissue filed October 1, 1910. Serial No. 584,949.

*To all whom it may concern:*

Be it known that I, RUSSELL H. BOWEN, of Palmyra, in the county of Burlington and State of New Jersey, have invented certain new and useful Improvements in Holders for Bearing Material in Pulleys, &c., whereof the following is a specification, reference being had to the accompanying drawings.

My invention relates to that class of bearing surfaces or bearing members in which inserted pieces or insets of cork or similar material are employed, an ordinary type of such a member being a pulley rim, and the principal objects of my invention are to provide means for securing and retaining such insets in position while at the same time simplifying the structure of the retaining members, to the end that they may be applied without complication or the addition of adjunctive parts to the pulley rim, or other bearing member.

In the accompanying drawings, Figure I, represents a partial side elevation of a pulley embodying my invention. Fig. II, is a partial plan view of the bearing surface of the pulley developed upon a plane surface, the scale being somewhat larger than Fig. I. Figs. III, and IV, are respectively partial sectional views on a still larger scale, upon the lines III, III, and IV, IV, of Fig. II.

I have illustrated by invention as applied to a pulley of that type in which the rim is built up from parallel segmental pieces 1, 1, of sheet metal, and it will be understood that such pulley may be of the type known as "split", that is to say, the pulley may be diametrically divided in order to facilitate application to a shaft. I do not however, intend to restrict my improvements to pulleys, it being only essential that the bearing member such as a rim of a pulley, shall be of such character and material as to permit the formation of the integral holding device about to be described. In carrying out my invention, I prefer to construct the pulley rim or other bearing member of sheet steel and to form the parts by means of pressure in dies.

Referring now to the drawings, 1, 1, represent the segmental pieces of the rim of the pulley, 2 the spokes, and 3, the hub member to which said spokes are attached in any convenient manner.

The segmental rim pieces may be united to one another and to the spokes by means of rivets 4, passing through inwardly projecting flanges 5, upon the proximate edges of the rim pieces, said rivets also passing through the outer ends of the spokes as shown.

At suitable intervals in the face of the rim pieces 1, I form a plurality of apertures 7, preferably of circular outline, to receive the insets 8, of cork, or other desired material, said apertures being preferably arranged in the staggered relation shown in Fig. II. The apertures are formed by stamping a disk-shaped portion of the metal of the rim radially inwardly and severing the edge of the inwardly stamped portion throughout a large part of its periphery, but leaving short portions intact at diametrical points, so as to form retaining bands to connect the disk with the rim.

Referring to the sectional views of Figs. III, and IV, 7, represents the edge of the aperture formed in the rim 1; 10, the approximately disk-shaped portion which has been stamped radially inward and which, as shown, is severed at the edges 11, from the metal of the rim, while it is connected thereto by the short bands 12, located at the unsevered portion of the edge. Consequently, while the disk-shaped portion, or bottom pieces, as I shall term them, substantially coincide, in their general contour, with the apertures, and are substantially parallel to the main surface of the rims, there are peripheral openings or free spaces, between the rim and the bottom pieces, except at the relatively short portions, where the bands 12, are situated. At these portions, the integrality of the metal is maintained and the bands being bent inwardly at a relatively abrupt angle, shoulders 13, are formed adjacent to the edge.

The bands 12, may be arranged, as shown in connection with the apertures 14, of Fig. II, transversely to the axis of the pulley, or they may be arranged parallel thereto, as shown at the aperture 15, of Fig. II. The insets 8, are preferably of cork, cylindrical in form, and of slightly larger diameter than the apertures 7, so that when forced down through said apertures into contact with the bottom pieces, the elasticity of the cork will cause it to spring outward somewhat on each side of the edge of the aperture, as indicated by the dotted lines in Fig. III, thus affording a firm grip upon the insets. The bottom pieces 10, prevent the insets from being forced through the apertures by external pressure, and the holding bands 12, prevent the tilting or lateral displacement of the insets and tend to minimize any shearing action of the edge of the metal upon the insets.

By the above mentioned system of construction, I obviate the necessity of employing a separate backing piece secured radially within and in proximity to the inner surface of the pulley rim or bearing member, such as has been heretofore employed, in some devices of this kind, or the use of separately formed pockets fastened to the rim or bearing member, to receive the insets.

I am aware that it is not new to provide pulley rims with inwardly extending integral tubular portions having prongs or projections at their inner ends, prongs being intended to be embedded in inset pieces contained within the tubes, but in such cases no bearing surface was provided for the bottom portions of the insets. By my improvements an extended bearing surface is afforded for the bottom of the insets, and the latter are permanently and efficiently retained in place.

While the most obvious application of my improved holder is in connection with a pulley rim, it will be understood that the same may be applicable to various other structures, in which it is desired to provide a metallic member with insets of different material. As such members are not necessarily convex, or circular, it will be understood that in my claims, I use the term "inwardly," to designate extension in a direction opposite to that of the actual bearing surface.

Having thus described my invention, I claim:—

1. The combination, with a bearing member having an aperture; of an inset engaging within said aperture, said bearing member having an inwardly projecting bottom piece extending beneath said aperture and at a distance from the outer surface of said bearing member, said bottom piece being integral with the bearing member at connecting portions, but having its edges free from the metal thereof, except at such connecting portions.

2. In a pulley, the combination, with a rim having apertures adapted to receive insets; of inwardly extending integral bands; and integral bottom pieces carried by said bands and having an extended surface, the edges of said bottom pieces being free from the metal of the rim except at the portions adjacent to said bands, substantially as set forth.

3. In a pulley, the combination, with a rim having apertures adapted to receive insets; of inwardly extending integral bands, arranged in diametrical relation to said apertures and forming shoulders adjacent to said apertures, and disk-shaped integral bottom pieces conforming substantially to the outline of said apertures and carried by said bands, the edges of said bottom pieces being free from the metal of the rim except at the parts adjacent to said bands, substantially as set forth.

In testimony whereof I have hereunto signed my name, at Philadelphia, Pennsylvania, this twenty-third day of September, 1910.

RUSSELL H. BOWEN.

Witnesses:
JAMES H. BELL,
E. L. FULLERTON.

Copies of this patent may be obtained for five cents each, by addressing the "Commissioner of Patents, Washington, D. C."